Jan. 10, 1956   G. SHIERS   2,730,336
ELECTRICALLY CONTROLLED HEATING AND COOLING SYSTEM
Filed April 20, 1953   3 Sheets-Sheet 1

INVENTOR.
GEORGE SHIERS
BY Herman L. Gordon
ATTORNEY

Jan. 10, 1956  G. SHIERS  2,730,336
ELECTRICALLY CONTROLLED HEATING AND COOLING SYSTEM
Filed April 20, 1953  3 Sheets-Sheet 2
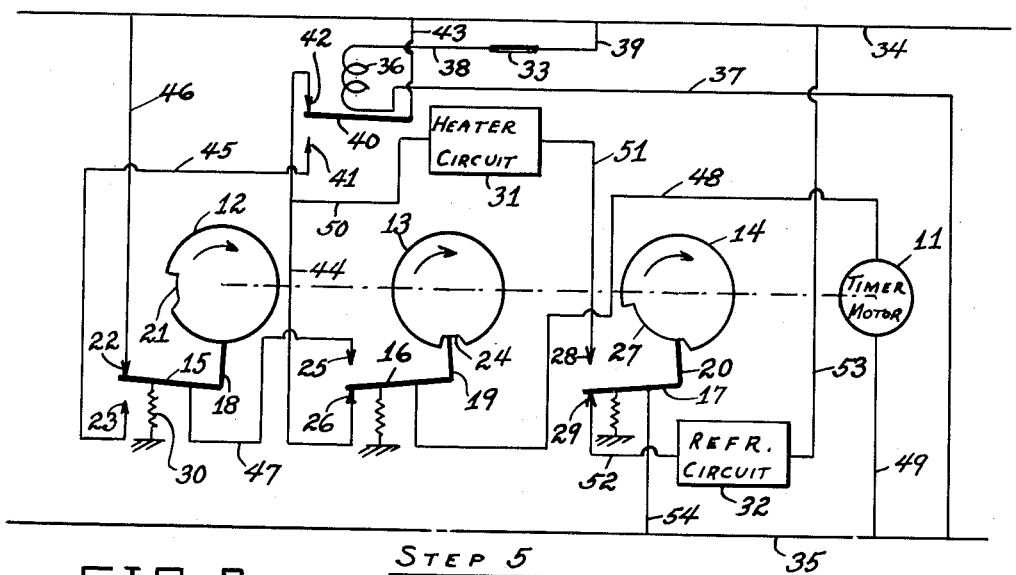
FIG.3  STEP 5
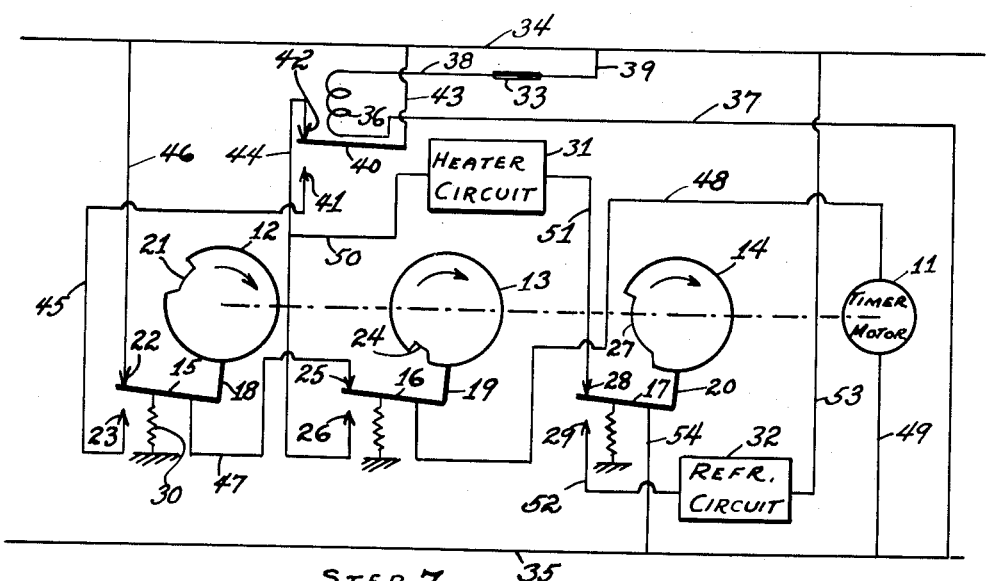
FIG.4  STEP 7
INVENTOR.
GEORGE SHIERS
BY Herman L. Gordon
ATTORNEY Jan. 10, 1956  G. SHIERS  2,730,336
ELECTRICALLY CONTROLLED HEATING AND COOLING SYSTEM
Filed April 20, 1953  3 Sheets-Sheet 3

INVENTOR.
GEORGE SHIERS
BY Herman L. Gordon
ATTORNEY

United States Patent Office 2,730,336
Patented Jan. 10, 1956

2,730,336

ELECTRICALLY CONTROLLED HEATING AND COOLING SYSTEM

George Shiers, Silver Spring, Md., assignor to American Instrument Company, Inc., Silver Spring, Md.

Application April 20, 1953, Serial No. 349,809

13 Claims. (Cl. 257—3)

This invention relates to electrical control systems, and more particularly to means for reducing control lag on refrigerated constant-temperature systems of the electrically operated type.

A main object of the invention is to provide a novel and improved means for maintaining close control of the temperature of an electrically operated constant-temperature device, said means being simple in construction, being reliable in operation, and preventing excessive starting and stopping of the refrigerator motors involved in the system, whereby the life of such motors is considerably extended.

A further object of the invention is to provide an improved closely controlled constant-temperature system of the electrically operated type suitable for use in temperature-humidity test apparatus and the like, said system involving relatively inexpensive components, providing quick action between the sensing element thereof and the power input means, and reducing to a minimum the unwanted time lag between the control action and the power response.

Further objects and advantages of the invention will become apparent from the following description and claims, and from the accompanying drawings, wherein:

Figure 3 shows the system of Figure 1 operated beyond the position of Figure 2 and in a condition where the demand for refrigeration is satisfied and where heat input is demanded.

Figure 4 shows the system of Figure 1 operated beyond the position of Figure 3 to energize the heater circuit of the system.

Figure 1:
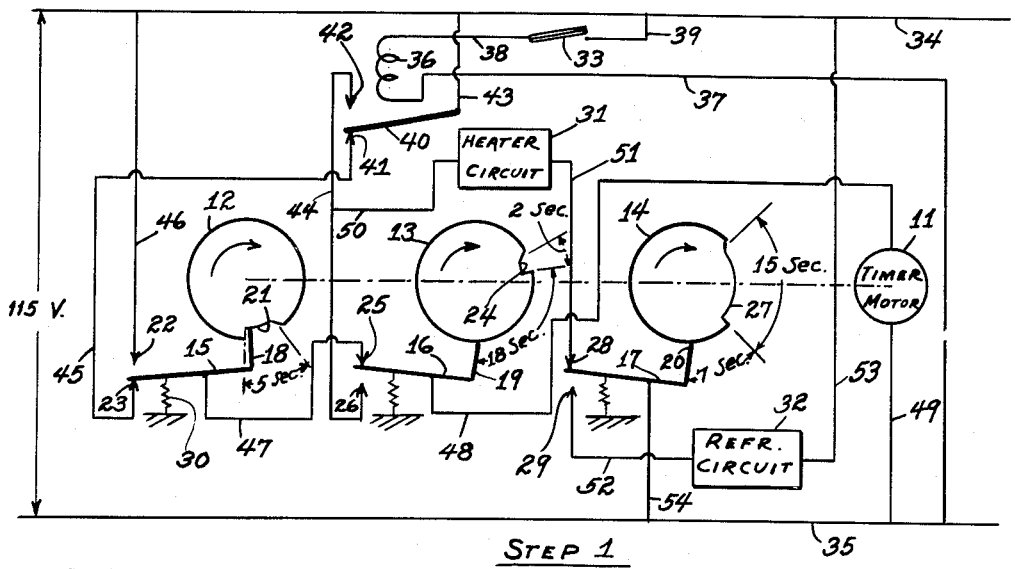
Figure 1 is a schematic wiring diagram of a temperature-controlled system constructed in accordance with the present invention, shown in a condition wherein refrigeration is demanded.

The maintenance of close control of constant-temperature equipment demands quick action between the sensing element and the power input means. For example, when the temperature rises above the set-point it is necessary to diminish or cut off power to the heating element; conversely, it is necessary to apply or increase power to the heater as soon as the temperature falls below the set-point.

One type of control commonly employed for constant-temperature apparatus utilizes the "on-off" method, in which the power input is controlled in bulk, i. e., power is either on or off, with no intermediate value. One modification of this method utilizes power input for heating to increase the temperature, and power input for refrigeration to decrease the temperature. This use of refrigeration enables closer control to be obtained, since thermal inertia of the equipment can be more quickly overcome as soon as the heat input is cut off, and also enables the operating range of such equipment to be extended below ambient conditions.

In laboratory humidity-temperature test apparatus to which the invention herein described has been applied, the apparatus utilizes a water bath controlled to a given temperature by an immersion heater, and, in opposition, a refrigerator unit driven by a 1 H. P. electric motor. Air is circulated over the water bath and through the work chamber, the air temperature being raised by a separate heater and the air being cooled by a spray system to the lower temperature of the water.

In this apparatus, heat transfer is by conduction and convection, with radiation entirely eliminated. Since the specific heat of air is 0.24, over the range of operation, and that of water is 1.0, it is clear that fluctuations of the water temperature will be reflected as fluctuations of air temperature; therefore it follows that any improvement of water temperature regulation will be a material aid in the maintenance of closer air temperature regulation. Furthermore, in this apparatus the combined effect of air temperature and water temperature is a given percentage of relative humidity in the work chamber of the apparatus at a specified air temperature, hence it follows that the end result of close humidity control is strictly dependent upon the close and accurate control of the air and water temperature.

It will be readily understood that a system of on-off control used in conjunction with a mechanical refrigeration compressor will require frequent starting and stopping of the compressor motor. Experience has shown that such repetitious operation of an electric motor of the split phase type is detrimental to the life of such motors, unless limited in some way to no more than a certain number of starts per hour. In practice, this number of starts, under average conditions, has been found to be approximately 60 per hour, as a maximum.

Hitherto, a simple cycle timer, or some form of time-delay relay, has been employed to limit the repetition rate of starting operations of the compressor motor to about one per minute. This has proved to be satisfactory as a protective measure for the motor, but by its nature has imposed a most undesirable time-lag on the control system as a whole. The result of this time-lag is to produce a much larger amplitude of deviations of temperature and/or humidity from the set-point than desired.

This time-lag has been produced by the direct interposition of a time-delay device to provide a lag between the regulator action and the consequent power control action. Furthermore, the prior methods in use impose an unnecessary and most undesirable delay in the heater response, since the heating control can and should be instantaneous and independent of any time-lag that may be introduced in the refrigeration circuit. The improved system herein described has among its objects the removal (as far as possible) of any lag between the regulator action and the heating circuit response. The excessive control lag of the prior art systems is due to a delay of the order of 30 seconds before wanted refrigeration can be applied, and, concurrently, the retention of heat input for the order of 30 seconds after the regulator has called for cessation of heat. Conversely, on the remaining half of the 60 second cycle, unwanted refrigeration is retained for about 30 seconds, with a concurrent delay of about 30 seconds before the desired heat input can be obtained. The cumulative delay times, therefore, equal approximately 120 seconds per cycle, due to the combined effects of response lags on both portions of the circuit. Furthermore, the minimum period of heat input and refrigeration input with prior art systems is about 30 seconds per cycle, another factor that effectually prevents close regulation.

The removal of this limitation (as far as possible) is another object of the present invention.

Figure 5:
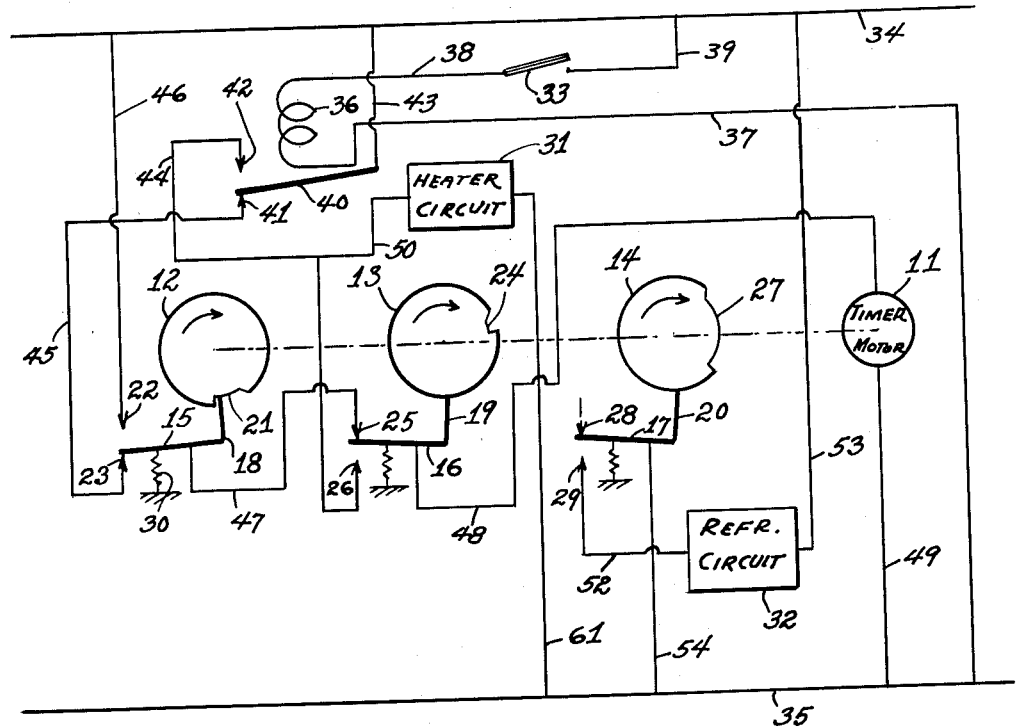
Figure 5 shows a further modification of the improved system of the present invention wherein the heater circuit is always under the control of the sensing element of the system.

The consecutive application of input power in the form of heat or refrigeration, with no overlap of either, is due to the need for splitting the load so that the total installed load (e. g., heat and refrigeration) cannot be applied simultaneously. For some applications instantaneous heat control, together with refrigeration is permissible, and is possible by making a slight revision of the circuit, as will be explained in connection with Figure 5, at the expense, however, of dual-loading.

In order to reduce to a minimum the unwanted time-lag between the control action and the power response, a cycle-timed circuit is employed, for example, as shown in Figure 1. The marked improvement in regulation thus obtained arises from a combination of the following effects:

1. Removal of "refrigeration-lag" from the heater circuit by providing for instantaneous off control of the heater.
2. Reduction of heat-on delay from about 30 seconds to about 4 seconds.
3. Reduction of refrigeration-on delay from about 30 seconds to about 7 seconds.
4. Reduction of refrigeration-off delay from about 30 seconds to about 4 seconds.
5. Reduction of minimum heat-on time from about 30 seconds to zero.
6. Reduction of minimum refrigeration-on time from about 30 seconds to about 15 seconds.

Various aspects that were considered during the evolution of this circuit were as follows:

7. Maintenance of one minute minimum intervals between consecutive starts of the refrigeration motor.
8. Reduction of the minimum refrigeration time per cycle.
9. Provision for instantaneous heat control as long as possible per cycle.
10. Provision for quick refrigeration control, to approach and therefore balance as closely as possible the ideal instantaneous control of heat.
11. Maximum reliability of all additional components.
12. Minimum cost for components and assembly.
13. Compactness.
14. Relative simplicity.
15. The use of standard parts.
16. Flexibility, to allow adaptation if possible to special requirements.
17. Accuracy, that is, repeatability of delay times and sequences under all conditions.

The cycle-timed circuit described below is based upon the fact that the time-delay cycle may be "telescoped" within the operative part of any given time period, thus allowing part of the time-delay cycle to occur concurrently with the application of power for heating or refrigeration.

Referring to the drawings, 11 designates the motor of a commercially available, adjustable three-cam electrical timer unit. For example, the timer unit may be similar to that manufactured by the R. W. Cramer Co., Inc., Centerbrook, Conn., Catalogue No. CF 3-3. The motor 11 is of the synchronous type and has a shaft speed of one revolution per minute. In this unit, the cams are adjustable both as to relative phase and as to the angular size of the notches in the peripheries of the individual cams. Said cams are designated at 12, 13 and 14, and are connected to the shaft of the motor 11, whereby they are driven simultaneously in a clockwise direction, as viewed in Figure 1, when motor 11 is energized. The timer unit is provided with the respective pivoted switch arms 15, 16 and 17 located adjacent the respective cams 12, 13 and 14, having respective follower arms 18, 19 and 20 biased into engagement with the peripheries of the respective cams.

Cam 12 is formed with a notch 21 subtending an angle corresponding to a period of 5 seconds of rotation. Adjacent the cam 12 the timer unit is provided with the fixed contacts 22 and 23 which are engageable by the switch arm 15. As shown in Figure 1, switch arm 15 engages lower contact 23 when the follower arm 18 is in the notch 21. At other times switch arm 15 engages upper contact 22.

Cam 13 is formed with a notch 24 displaced counterclockwise from notch 21 by an angle corresponding to 18 seconds of rotation. Notch 24 subtends an angle corresponding to 2 seconds of rotation. Adjacent the cam 13 the timer unit is provided with the fixed contacts 25 and 26 which are engageable by the switch arm 16. As shown in Figure 1, switch arm 16 engages the upper contact 25 when follower arm 19 engages the outer periphery of cam 13. When follower arm 19 is in the notch 24, switch arm 16 engages lower contact 26.

Cam 14 is formed with a notch 27 displaced counterclockwise from notch 21 by an angle corresponding to 7 seconds of rotation. Notch 27 subtends an angle corresponding to 15 seconds of rotation. Adjacent the cam 14 the timer unit is provided with the fixed contacts 28 and 29 which are engageable by the switch arm 17. As shown in Figure 1, switch arm 17 engages upper contact 28 when follower arm 20 engages the outer periphery of cam 14. When follower arm 20 is in the notch 27, switch arm 17 engages lower contact 29.

The respective switch arms 15, 16 and 17 are biased counterclockwise, as viewed in Figure 1, by suitable spring means, such as the springs 30.

The heater circuit is designated generally at 31 and the refrigeration circuit is designated generally at 32. Shown diagrammatically at 33 is a settable temperature sensing device, such as a thermostatic switch, which opens when the system requires refrigeration and closes when the system requires heat, thus serving to detect fluctuations of the system from a desired temperature value.

Designated at 34 and 35 are the respective power supply wires. A relay 36 has one terminal thereof connected by a wire 37 to the line wire 35. The other terminal of the relay is connected through thermostatic switch 33, as by wires 38 and 39, to the line wire 34. Relay 36 is provided with the armature 40 engageable with the relay contacts 41 and 42. As shown in Figure 1, when the relay 36 is deenergized, armature 40 engages lower contact 41. Energization of the relay causes armature 40 to engage upper contact 42.

Armature 40 is connected by a wire 43 to line wire 34. Upper contact 42 is connected by a wire 44 to the lower contact 26 of cam switch arm 16. Lower contact 41 is connected by a wire 45 to lower contact 23 of cam switch arm 15. Upper contact 22 of said cam switch arm 15 is connected by a wire 46 to line wire 34.

Cam switch arm 15 is connected by a wire 47 to the upper contact 25 of cam switch arm 16. Cam switch arm 16 is connected by a wire 48 to one terminal of timer motor 11. The other terminal of the timer motor is connected by a wire 49 to line wire 35.

One terminal of heater circuit 31 is connected by a wire 50 to the wire 44. The other terminal of the heater circuit is connected by a wire 51 to the upper contact 28 of cam switch arm 17. One terminal of refrigeration circuit 32 is connected by a wire 52 to the lower contact 29 of the cam switch arm 17. The other terminal of the refrigeration circuit 32 is connected by a wire 53 to the line wire 34. Switch arm 17 is connected to line wire 35 by a wire 54.

With the elements arranged as shown in Figure 1, and with the thermostatic switch 33 closed, the timer motor 11 will be deenergized, since armature 40 is elevated and engages contact 42. Under these conditions, the heater circuit is energized. When the system temperature rises to a value sufficient to open switch 33, whereby refrigeration is demanded, relay 36 becomes deenergized and armature 40 drops into engagement with contact 41. This energizes motor 11 by a circuit comprising line wire 34, wire 43, armature 40, contact 41, wire 45, contact 23, switch arm 15, wire 47, contact 25, switch arm 16, wire 48, timer motor 11, wire 49 and line wire 35. Thus cams 12, 13 and 14 begin rotation.

From this point on, the operation of the system may be considered as going through the following steps:

Step 1 is assumed to be the condition at the moment the sensing device 33 calls for refrigeration, as shown in Figure 1. If armature 40 remains continuously in engagement with contact 41, 5 seconds will elapse before Step 2 is reached. Due to possible fluttering of the sensing device, the actual time may be longer, the timing motor 11 consequently "inching" until Step 2 is reached.

Figure 2:
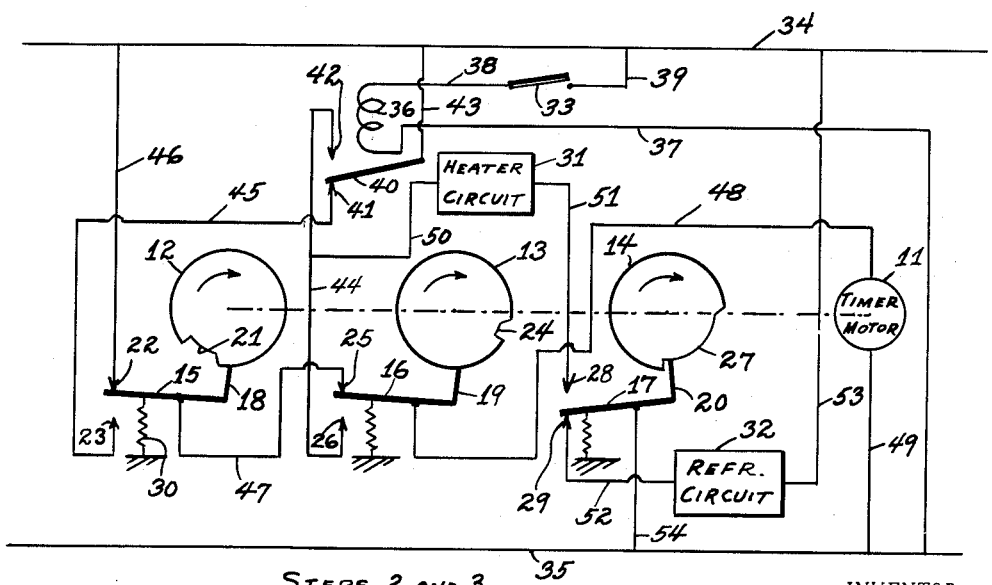
Figure 2 shows the system of Figure 1 operated beond the position of Figure 1 to energize the refrigeration circuit of the system.

Step 2 is the condition shown in Figure 2, wherein switch arm 15 is rotated by cam 12 into engagement with contact 22, thus by-passing relay 36. At this point, switch arm 15 is connected to line wire 34 by wire 46, and any fluttering of the sensing device or relay ceases to have any effect upon the timed cycle, whereby the timing motor 11 is now driven positively toward the condition to Step 3, also shown in Figure 2.

Step 3 is the condition wherein follower arm 20 of switch arm 17 is in notch 27 of cam 14 and switch arm 17 thus engages contact 29, energizing the refrigeration circuit 32 by connecting wire 52 to line wire 35 through contact 29, switch arm 17 and wire 54. The refrigeration motor is thus started. The timer motor 11 is still being positively driven through its own circuit until Step 4 is reached. In this manner, 11 seconds of "delay" time are consumed coincident with the operation of the refrigeration motor.

Step 4 is the condition at the end of the timer drive period, wherein the circuit of the timer motor 11 is broken by the movement of follower arm 19 of switch arm 16 into the notch 24 of cam 13. Thus, switch arm 16 disengages from contact 25, breaking the timer motor circuit. The timer motor 11 will remain deenergized until sensing device 33 calls for heat. During this period, the refrigeration circuit 32 remains energized.

Step 5, shown in Figure 3, is the condition wherein the system temperature has dropped sufficiently to close thermostatic switch 33, whereby heat is demanded, the relay 36 being again energized, by the engagement of armature 40 with its upper contact 42. The timer motor 11 is energized through a circuit comprising line wire 34, wire 43, armature 40, contact 42, wire 44, contact 26, switch arm 16, wire 48, the timer motor 11, wire 49, and line wire 35. With no fluttering of the control relay 36, this period lasts for 2 seconds minimum, while fluttering will extend this time and cause the timing motor 11 to "inch" toward Step 6.

Step 6 is the condition wherein cam switch arm 16 is rotated by cam 13 into engagement with contact 25, which connects the timing motor 11 to line wire 34 through switch arm 16, contact 25, wire 47, switch arm 15, contact 22 and wire 46, providing positive drive to the condition of Step 7, shown in Figure 4.

Step 7 is the condition wherein switch arm 17 has been rotated by cam 14 into engagement with its upper contact 28, which deenergizes the refrigeration circuit 32 and energizes the heater circuit 31. As will be seen from Figure 4, the heater circuit is now energized by a circuit comprising line wire 34, wire 43, armature 40, contact 42, wire 44, wire 50, heater circuit 31, wire 51, contact 28, switch arm 17, wire 54 and line wire 35. The timing motor 11 is still being positively driven to the next position, during which time the delay period is again concurrent with an operative part of the cycle. In this manner, a maximum of 38 seconds of "delay" time are consumed in the heating portion of the cycle.

Step 8 is the condition wherein follower arm 18 enters notch 21 with thermostatic switch 33 still closed. This disconnects timer motor 11 from the line at contact 22. The timer motor now stops, having completed one cycle over a period of 60 seconds minimum, plus the above fluttering interim time, if any. The circuit will remain thus until sensing device 33 again calls for refrigeration. Should the demand for refrigeration exist before or at the completion of the cycle, the timer will continue to operate on into Step 1 and recommence the cycle above described.

It will be noted that heat control in the circuit above described is always under the influence of the sensing device 33 and control relay 36, excepting the periods when the refrigeration circuit 32 is energized (Step 3 through Step 7). The heat control period is therefore about 75% of the total time of the cycle. The heat control period may be increased to 100% of the cycle time by connecting the heating circuit directly to line wire 35, as by a wire 61 in Figure 5, instead of to contact 28 of cam switch arm 17. With the connection of Figure 5, dual-loading will occur during part of the refrigeration cycle.

Broadly, it will be apparent that the system first above described possesses the following salient characteristics:

1. The retention of a minimum time-lag in the compressor motor circuit in such a manner as to minimize the effect of this delay on a related controlled circuit.

2. The separation of the refrigeration and heater circuits, which are related and interconnected, in such a manner that a necessary time-delay in one circuit (i. e., in the refrigeration circuit) imposes the least possible delay on the other circuit.

3. Reduction to a minimum of the time lag between the operation of the regulatory device (the temperature sensing element) and the operation of the related controlled circuits in a particular manner, even where one of the controlled circuits (i. e., the refrigeration circuit) requires a specific time-delay in operation.

4. Prevention of undesired random functioning of the timing device or the controlled circuits as a result of possible random operation of the regulatory device (i. e., the temperature sensing element 33 or control relay 36).

5. Reduction of control lag and close maintenance of the set temperature of the controlled system.

It will be further apparent that the utility of the circuit above described is not limited solely to the control of the specific devices, namely, refrigeration and heater devices, above described, nor to the exact arrangement illustrated in the drawings, but may be employed so as to perform a discriminatory and/or supervisory function and cause other circuits additional to the two controlled devices to be acted upon in a predetermined manner.

While a specific embodiment of an improved electrical control system has been disclosed in the above description, it will be understood that various modifications within the spirit of the invention may occur to those skilled in the art. Therefore it is intended that no limitations be placed on the invention except as defined by the scope of the appended claims.

What is claimed is:

1. In a control system for a space whose temperature is to be controlled, a temperature-responsive element in said space, a timing device controlled by said temperature-responsive element, a refrigeration circuit arranged to cool said space, a heater circuit arranged to heat said space, means for energizing said refrigeration circuit responsive to a first predetermined minimum period of operation of said timing device, means for maintaining said refrigeration circuit energized through a second predetermined minimum period of operation of said timing device, and means, including said temperature-responsive element, arranged for deenergizing said refrigeration circuit and energizing said heater circuit at the end of said second predetermined minimum period of operation of said timing device, whereby the repetition rate of starting operations of the refrigeration circuit is limited to at least the repetition rate of the cycle of the timing device.

2. In a control system for a space whose temperature is to be controlled, a temperature-responsive element in said space, a timing device controlled by said temperature-responsive element, means for rendering said timing device independent of said temperature-responsive element after a first predetermined minimum period of operation of said timing device, a refrigeration circuit arranged to cool said space, a heater circuit arranged to heat said space, means for energizing said refrigeration circuit responsive to a second predetermined period of operation of said timing device, means for maintaining said refrigeration circuit energized through a third predetermined period of operation of said timing device, and means, including said temperature-responsive element, arranged for deenergizing said refrigeration circuit and energizing said heater circuit at the end of said third predetermined period of operation of said timing device, whereby the repetition rate of starting operations of the refrigeration circuit is limited to at least the repetition rate of the cycle of the timing device.

3. In a control system for a space whose temperature is to be controlled, a temperature-responsive element in said space, a timing device controlled by said temperature-responsive element, means for rendering said timing device independent of said condition-responsive element after a first predetermined minimum period of operation of said timing device, a refrigeration circuit arranged to cool said space, a heater circuit arranged to heat said space, means for energizing said refrigeration circuit responsive to a second predetermined period of operation of said timing device, means for maintaining said refrigeration circuit energized through a third predetermined period of operation of said timing device, means for placing the timing device again under the control of said temperature-responsive element at the end of said third period, and means, including said temperature-responsive element, arranged for deenergizing said refrigeration circuit and energizing said heater circuit responsive to a further predetermined period of operation of said timing device, whereby the repetition rate of starting operations of the refrigeration circuit is limited to at least the repetition rate of the cycle of the timing device.

4. In a control system for a space whose temperature is to be controlled, a temperature-responsive element in said space, a timing device controlled by said temperature-responsive element, means for rendering said timing device independent of said temperature-responsive element after a first predetermined minimum period of operation of said timing device, a refrigeration circuit arranged to cool said space, a heater circuit arranged to heat said space, means for energizing said refrigeration circuit responsive to a second predetermined period of operation of said timing device, means for maintaining said refrigeration circuit energized through a third predetermined period of operation of said timing device, means for placing the timing device again under the control of said temperature-responsive element at the end of said third period, means for deenergizing said refrigeration circuit and energizing said heater circuit responsive to a further predetermined period of operation of said timing device, and means placing said heater circuit under the control of said temperature-responsive element at the end of said further predetermined period of operation of said timing device, whereby the repetition rate of starting operations of the refrigeration circuit is limited to at least the repetition rate of the cycle of the timing device.

5. In a control system for a space whose temperature is to be controlled, a temperature-responsive element in said space, a timing device controlled by said temperature-responsive element, means for rendering said timing device independent of said temperature-responsive element after a first predetermined minimum period of operation of said timing device, a refrigeration circuit arranged to cool said space, a heater circuit arranged to heat said space, means for energizing said refrigeration circuit responsive to a second predetermined period of operation of said timing device, means for maintaining said refrigeration circuit energized through a third predetermined period of operation of said timing device, means for placing the timing device again under the control of said temperature-responsive element at the end of said third period, means for deenergizing said refrigeration circuit and energizing said heater circuit responsive to a further predetermined period of operation of said timing device, means again rendering said timing device independent of said temperature-responsive element before the end of said further period of operation of the timing device, and means placing said heater circuit under the control of said temperature-responsive element at the end of said further predetermined period of operation of said timing device, whereby the repetition rate of starting operations of the refrigeration circuit is limited to at least the repetition rate of the cycle of the timing device.

6. In a control system for a space whose temperature is to be controlled, a temperature-sensing device in said space, an electrically operated cyclic timer controlled by said temperature-sensing device, a refrigeration circuit arranged to cool said space, a heating circuit arranged to heat said space, means for energizing said refrigeration circuit responsive to a first predetermined minimum period of energization of said timer, means for maintaining said refrigeration circuit energized through a second predetermined minimum period of operation of said timer, and means, including said temperature-sensing device, arranged for deenergizing said refrigeration circuit and energizing said heating circuit at the end of said second predetermined minimum period of operation of said timer, whereby the repetition rate of starting operations of the refrigeration circuit is limited to at least the repetition rate of the cycle of said timer.

7. In a control system for a space whose temperature is to be controlled, a temperature-sensing device in said space, an electrically operated cyclic timer controlled by said temperature-sensing device, a refrigeration circuit arranged to cool said space, a heating circuit arranged to heat said space, means for energizing said refrigeration circuit responsive to a first predetermined minimum period of energization of said timer, means for rendering said timer independent of the temperature-sensing device before the end of said first minimum period, means for maintaining said refrigeration circuit energized through a second predetermined period of operation of said timer, means for restoring control of the temperature-sensing device over the timer during said second period and for again rendering the timer independent of the temperature-sensing device before the end of said second period, and means, including said temperature-sensing device, arranged for deenergizing said refrigeration circuit and energizing said heating circuit at the end of said second predetermined period of operation of said timer, whereby the repetition rate of starting operations of the refrigeration circuit is limited to at least the repetition rate of the cycle of said timer.

8. In a control system for a space whose temperature is to be controlled, a temperature-sensing device in said space, an electrically operated cyclic timer controlled by said temperature-sensing device, a refrigeration circuit arranged to cool said space, a heating circuit arranged to heat said space, means for energizing said refrigeration circuit responsive to a first predetermined minimum period of energization of said timer, means for rendering said timer independent of the temperature-sensing device before the end of said first minimum period, means for maintaining said refrigeration circuit energized through a second predetermined period of operation of said timer, means for restoring control of the temperature-sensing device over the timer during said second period and for again rendering the timer independent of the temperature-sensing device before the end of said second period, means, including said temperature-sensing device, arranged for deenergizing said refrigeration circuit and energizing said heating circuit at the end of said second predetermined period of operation of said timer, and means controlled by said temperature-sensing device for deenergizing said heating circuit during the period of operation of the timer following said second period, whereby the repetition rate of starting operations of the refrigeration circuit is limited to at least the repetition rate of the cycle of said timer.

9. In a control system for a space whose temperature is to be controlled, a temperature-responsive device in said space, an electrically operated cyclic timer controlled by said temperature-responsive device, a refrigeration circuit arranged to cool said space, a heater circuit arranged to heat said space, means for energizing said refrigeration circuit responsive to a first predetermined minimum period of energization of said timer, means for rendering said timer independent of the temperature-responsive device before the end of said first minimum period, means for maintaining said refrigeration circuit energized through a second predetermined period of operation of said timer, means for restoring control of the temperature-responsive device over the timer during said second period and for again rendering the timer independent of the temperature-responsive device before the end of said second period, and means, including said temperature-responsive device, arranged for deenergizing said refrigeration circuit and energizing said heater circuit at the end of said second predetermined period of operation of said timer, whereby the repetition rate of starting operations of the refrigeration circuit is limited to at least the repetition rate of the cycle of said timer.

10. In a control system for a space whose temperature is to be controlled, a temperature-responsive device in said space, an electrically operated cyclic timer controlled by said temperature-responsive device, a refrigeration circuit arranged to cool said space, a heater circuit arranged to heat said space, means for energizing said refrigeration circuit responsive to a first predetermined minimum period of energization of said timer, means for rendering said timer independent of the temperature-responsive device before the end of said first minimum period, means for maintaining said refrigeration circuit energized through a second predetermined period of operation of said timer, means for restoring control of the temperature-responsive device over the timer during said second period and for again rendering the timer independent of the temperature-responsive device before the end of said second period, means, including said temperature-responsive device, arranged for deenergizing said refrigeration circuit and energizing said heater circuit at the end of said second predetermined period of operation of said timer, and means controlled by said temperature-responsive device for deenergizing said heater circuit during the period of operation of the timer following said second period, whereby the repetition rate of starting operations of the refrigeration circuit is limited to at least the repetition rate of the cycle of said timer.

11. In a control system for a space whose temperature is to be controlled, a temperature-sensing device in said space, an electrically operated cyclic timer controlled by said sensing device, a refrigeration circuit arranged to cool said space, a heating circuit arranged to heat said space, means for energizing said refrigeration circuit responsive to a first minimum period of energization of said timer, means for maintaining said refrigeration circuit energized through a second predetermined minimum period of operation of said timer, and means, including said temperature-sensing device, arranged for deenergizing said refrigeration circuit and energizing said heating circuit at the end of said second predetermined minimum period of operation of said timer, whereby the repetition rate of starting operations of the refrigeration circuit is limited to at least the repetition rate of the cycle of said timer.

12. In a control system for a space whose temperature is to be controlled, a temperature-sensing device in said space, an electrically operated cyclic timer controlled by said sensing device, a refrigeration circuit arranged to cool said space, a heating circuit arranged to heat said space, means for energizing said refrigeration circuit responsive to a first predetermined minimum period of energization of said timer, means for rendering said timer independent of the sensing device before the end of said first minimum period, means for maintaining said refrigeration circuit energized through a second predetermined period of operation of said timer, means for restoring control of the sensing device over the timer during said second period and for again rendering the timer independent of the sensing device before the end of said second period, means, including said temperature-sensing device, arranged for deenergizing said refrigeration circuit and energizing said heating circuit at the end of said second predetermined period of operation of said timer, and means controlled by said sensing device for deenergizing said heating circuit during the period of operation of the timer following said second period, whereby the repetition rate of starting operations of the refrigeration circuit is limited to at least the repetition rate of the cycle of said timer.

13. In a control system for a space whose temperature is to be controlled, a temperature-sensing device in said space, an electrically operated cyclic timer controlled by said sensing device, a refrigeration circuit arranged to cool said space, a heating circuit arranged to heat said space, means for energizing said refrigeration circuit responsive to a first predetermined minimum period of energization of said timer, means for rendering said timer independent of the sensing device before the end of said first minimum period, means for maintaining said refrigeration circuit energized through a second predetermined period of operation of said timer, means for restoring control of the sensing device over the timer during said second period and for again rendering the timer independent of the sensing device before the end of said second period, and means, including said temperature-sensing device, arranged for deenergizing said refrigeration circuit and energizing said heating circuit at the end of said second predetermined period of operation of said timer, whereby the repetition rate of starting operations of the refrigeration circuit is limited to at least the repetition rate of the cycle of said timer.

References Cited in the file of this patent

UNITED STATES PATENTS

| Number | Name | Date |
|---|---|---|
| 1,749,444 | Rae | Mar. 4, 1930 |
| 2,100,284 | Kriechbaum | Nov. 23, 1937 |
| 2,136,559 | Miller | Nov. 15, 1938 |
| 2,400,472 | Strickland | May 14, 1946 |
| 2,504,794 | Berman et al. | Apr. 18, 1950 |
| 2,551,927 | Charles | May 8, 1951 |
| 2,561,067 | Newton | July 17, 1951 |